United States Patent Office 3,842,110
Patented Oct. 15, 1974

3,842,110
PROCESS FOR PRODUCING OCTAPHENYLTETRA-
CYCLOSILOXANE
John S. Razzano, Troy, N.Y., assignor to General
Electric Company, Waterford, N.Y.
No Drawing. Filed Oct. 11, 1973, Ser. No. 405,310
Int. Cl. C07f 7/08
U.S. Cl. 260—448.2 E                    11 Claims

ABSTRACT OF THE DISCLOSURE

A process for producing octaphenyltetracyclosiloxane comprising contacting diphenyldihalogensilane with an alcohol so as to completely alkoxylate the silane, removing most of the acid that is formed during such alkoxylation reaction by heating the mixture, taking the substantially alkoxylated silane which is preferably made neutral and adding to it a mixture of water, a water-immiscible organic solvent, adding to this mixture an alkaline arrangement catalyst and heating the resulting mixture from 40 to below 80° C. so as to form the desired product. During this heating step most of the alcohol and water by-products are removed. As soon as this is done, the alkaline rearrangement catalyst and the mixture may be neutralized and the mixture heated at elevated temperatures so as to azeotrope the remaining water out with the water-immiscible organic solvent.

PROCESS FOR PRODUCING OCTAPHENYL-
TETRACYCLOSILOXANE

Background of the Invention

The present invention relates to a process for producing octaphenyltetracyclosiloxane and more particularly the present invention relates to a process for producing octaphenyltetracyclosiloxane by first substituting all the halogen groups in diphenyldihalogensilane with hydrocarbonoxy groups.

It is desired to have in many silicone polymers, whether such polymers are silicone oils or silanol-terminated diorganopolysiloxanes or triorganosiloxy end-stopped diorganopolysiloxanes of high viscosities, a certain phenyl concentration or the presence of a certain amount of diphenylsiloxy units in such polymers. The desire to have a certain amount of diphenylsiloxy units in the silicone oils or polymers is that the phenyl group imparts a certain amount of flame retardance as well as enhances the low temperature flexibility of the final cured elastomer.

In order to produce such silicone oils or diorganopolysiloxanes containing diphenylsiloxy units in the desired concentration, octaphenyltetracyclosiloxanes may be equilibrated with other types of tetracyclicsiloxanes, that is, other types of tetracyclicsiloxanes containing substituent groups other than phenyl, in the desired concentrations in the presence of an alkaline rearrangement catalyst at elevated temperatures, that is, temperatures of anywhere from 100° to 250° C., for a period of time until the desired linear diorganopolysiloxane polymer containing the desired concentration of diphenylsiloxy units is formed. When equilibration is reached usually about 85% of the tetracyclicsiloxanes initially used in the reaction mixture are converted to the linear diorganopolysiloxane polymer, while 15% of the original cyclictetrasiloxanes remain in cyclic form. At this equilibration point, as much of the tetracyclicsiloxanes is being converted to the linear diorganopolysiloxane polymer as there is of the linear diorganopolysiloxane polymer that has been formed being broken up to form tetracyclicsiloxanes.

In such equilibration reaction, if it is desired to produce triorganosiloxy end-stopped linear diorganopolysiloxanes, then there is added to the reaction mixture sufficient amounts of chain stopper which are usually trimers, tetramers or pentamers which are chain-stopped by triorganosiloxy units.

Utilizing this procedure, there can be obtained high viscosity linear diorganopolysiloxanes chain-stopped with triorganosiloxy units having the desired concentration of diphenylsiloxy units and these polymers may be utilized in a manner well known in the art to produce heat vulcanizable silicone rubber compositions.

If it is desired to produce a silanol-stopped linear diorganopolysiloxane, the high viscosity polymer that is formed is simply taken and steam is passed through it so as to form lower viscosity, that is, polymers with a viscosity anywhere from 1000 centipoise at 25° C. to 1,000,000 centipoise at 25° C., which diorganopolysiloxane polymers are terminated with silanol groups and have the desired concentration of diphenylsiloxy units in them.

The triorganosiloxy end-stopped diorganopolysiloxane polymers made by the process as discussed previously depending on how much a chain-stopper was utilized in the mixture may have a viscosity of anywhere from 1000 centipoise at 25° C. to 200,000,000 centipoise at 25° C. and which polymers may be utilized either as oils, hydraulic fluids of various kinds or, as has been stated previously, for the base polymer for forming heat vulcanizable silicone rubber compositions have the desired diphenylsiloxy unit concentration in them.

With the above explanation, it should be pointed out that in the equilibration procedure it is most desirable to utilize tetracyclicsiloxanes in the equilibration reaction rather than tricyclicsiloxanes or pentacyclicsiloxanes since with the use of tetracyclicsiloxanes the highest efficiency in the equilibration reaction is obtained of the desired polymer. In addition, in order to have as high efficiency as possible of the desired linear diorganopolysiloxane polymer, it is necessary that the tetracyclicsiloxanes be as pure as possible.

Accordingly, in the past one process for producing fairly pure octaphenyltetracyclicsiloxane was to take diphenyldichlorosilane and hydrolyze it with water so as to produce the diphenylsilane diol. This diphenylsilane diol was then taken and a certain amount of a water-immiscible solvent, such as toluene, was added to it; an alkaline rearrangement catalyst, such as potassium hydroxide, was added to it, and the resulting mixture was refluxed until the maximum concentration of octaphenyltetracyclicsiloxane had been formed from the diphenylsilane diol.

As can be envisioned in this process of forming the octaphenyltetracyclicsiloxane, it was necessary to utilize as high a purity of diphenylsilane diol in order to maximize the yield of the octaphenyltetracyclicsiloxane in the refluxing procedure. However, it was difficult to obtain high purity diphenylsilane diol from diphenyldichlorosilane by the prior hydrolysis procedures of the past since when diphenyldichlorosilane was hydrolyzed with water there was formed in the hydrolysis mixture hydrogen chloride which tended to cause the diphenylsilane diol to condense to form trimers, dimers, pentamers and various other materials which material resulted in the lowering of the yield of diphenylsilane diol. In order to maximize the yield of the diphenylsilane diol from the diphenyldichlorosilane, the procedure was adopted in which the diphenyldichlorosilane was hydrolyzed in the presence of water and a polar solvent and specifically large quantities of a polar solvent which acted as the stabilizing agent. The cheapest one of such polar solvents is acetone which was frequently used. In addition, large quantities of sodium bicarbonate was used in the hydrolysis mixture so as to neutralize the hydrochloric acid that was formed during the hydrolysis of the diphenyldichlorosilane and to create a buffer solution of a pH of anywhere from 5 to 9.

Although such a utilization of a large quantity of polar solvent and sodium bicarbonate resulted in the forming of larger quantities than the prior art processes of diphenylsilane diol, several disadvantages were associated with this procedure. In one aspect the diphenylsilane diol that was formed unless it was strictly neutral, that is, about a pH of 7, it tended to still condense and form dimers, trimers and pentamers.

Another disadvantage was the use of large quantities of polar solvents such as, acetone which necessitated the use of large vessels and there resulted as a by-product of the process there being formed large quantities of acetone in which was dissolved sodium chloride. This mixture of polar solvent and sodium chloride was very difficult to dispose of and/or recycle in the process. The disposal of such polar solvent even proved to be a bigger problem with the present day water pollution statutes.

Accordingly, it is one object of the present invention to provide a simple and efficient process for producing octaphenyltetracyclicsiloxane.

It is another object of the present invention to provide a process for producing octaphenyltetracyclicsiloxane which does not result in the production and use of large quantities of polar solvent which is difficult to recycle or to dispose of.

It is yet another object of the present invention to provide a process for producing octaphenyltetracyclicsiloxane which results in the formation of solvents and materials in the process which can be easily disposed of and do not create a pollution problem.

It is an additional object of the present invention to provide a process for producing octaphenyltetracyclicsiloxane from diphenyldichlorosilane in maximum yield.

These and other objects of the present invention are encompassed by means of inventions set forth below.

Summary of the Invention

In accordance with the present invention, there is provided a process for producing octaphenyltetracyclicsiloxane comprising contacting $(C_6H_5)_2SiX_2$, where X is halogen and which compound has trace amounts of the other halogen silane with an alcohol of the formula ROH and optionally water, where R is selected from monovalent hydrocarbon radicals and halogenated monovalent hydrocarbon radicals of up to 8 carbon atoms to form substantially a reaction product of the formula, $$(C_6H_5)_2Si(OR)_2,$$

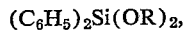

removing any acid that is formed in the foregoing alkoxylation procedure, adding water, a water-imiscible organic solvent and an alkaline rearrangement catalyst to the alkoxylated silane and heating the resulting mixture from 40 to 80° C. so as to give off alcohol as a by-product and forming the desired octaphenyltetracyclicsiloxane.

After a period of reaction time of anywhere from 1 to 6 hours, there is added a neutralizing acid to the reaction mixture so as to neutralize the alkaline metal rearrangement catalyst such that the reaction mixture has acidity or alkanidity of anywhere from 5 to 10 parts per million and then the reaction mixture is heated to above 100° C. so as to azeotrope out all the water in the reaction mixture along with the water-immiscible organic solvent. When all the water has been azeotroped out of the reaction mixture then the solution can be cooled to room temperature so as to precipitate out of the water-immiscible organic solvent solution a maximum amount of the octaphenyltetracyclicsiloxane.

Generally, in the first step of the process where the alcohol is added to the diphenyldihalogensilane, there is added at least 2.0 moles of the alcohol per mole of the diphenyldihalogensilane. In the refluxing step where the alkaline rearrangement catalyst is present there is added anywhere from 1.0 moles to 4.0 moles of water per mole of the alkoxylated diphenylsilane and at least two moles of the water-immiscible organic solvent per mole of the diphenyl alkoxylated silane. In the refluxing step, the alkaline rearrangement catalyst is utilized at a concentration of anywhere from 10 to 5000 parts per million and the water-immiscible solvent is preferably selected from the class of toluene, xylene, heptane, octane and cyclohexane although any organic non-polar solvent may be utilized as long as such solvent will dissolve the octaphenylcyclotetrasiloxane at high temperature.

The preferable alcohols for use in this process are methanol, ethanol, propanol and butanol.

Description of the Preferred Embodiment

The R radical of the alcohol defined in the foregoing process is preferably selected from monovalent hydrocarbon radicals, halogenated monovalent hydrocarbon radicals of up to 8 carbon atoms. Such radicals may be alkyl radicals such as methyl, ethyl, hexyl, propyl and etc.; cycloalkyl radicals such as, cyclohexyl, cycloheptyl and etc.; mononuclear aryl radicals such as, phenyl, methylphenyl, ethylphenyl and etc.; alkenyl radicals such as, vinyl, allyl and etc.; and alkyloxyalkylene radicals such as, methyloxyethylene and etc. Most preferably, the R radical is selected from alkyl radicals and alkyloxyalkylene radicals of 1 to 5 carbon atoms.

In the present processes the initial starting material is diphenyldihalogensilane, most preferably, the halogen is chlorine since that is the cheapest starting material. Accordingly, with this process, diphenyldichlorosilane is mixed with at least 2.0 moles of the alcohol per mole of the diphenyldichlorosilane. Preferably, there is utilized at least 2 moles of the alcohol per moles of the diphenyldichlorosilane such that the chlorine groups in the silane will be completely substituted by hydrocarbonoxy groups. Although, 50 to 100% excess of alcohol can be utilized in this initial part of the process, no advantages are gained since as a result of the excess alcohol there is necessitated an additional stripping step to remove the excess alcohol from the reaction mixture after the alkoxylated diphenylsilane has been produced. The reaction is preferably carried out at room temperature or below room temperature. Desirably the alcohol is added to the diphenyldichlorosilane since such addition procedure initally reduces the reaction mixture temperature below room temperature and at the final stages of the mixing maintains the reaction mixture at room temperature. It should be appointed that in this initial part of the process there can be added to the chlorosilanes at least 2.0 moles of a mixture of water and alcohol per mole of the diphenyldichlorosilane where up to 50 mole percent of the mixture comprises water. In such a process, it is necessary to begin with a fairly pure diphenyldichlorosilane such as one which contains at a maximum of about 1% by weight of impurities such as, other chlorosilanes and more specifically phenyl containing chlorosilanes.

Accordingly, in the process the alcohol or alcohol and water mixture is preferably added to the diphenyldichlorosilane and the reaction mixture is stirred and maintained at room temperature or below room temperature until all of the alcohol or alcohol and water has been added. When all the alcohol has been added in accordance with the present process, then there will be obtained a substantially alkoxylated or hydrocarbonoxyated diphenylsilane or alkoxylated tetraphenyl dimer. This mixing procedure usually takes about anywhere from ½ hour to 4 hours. At the end of that time, the reaction mixture is heated at elevated temperatures of anywhere from 25 to 60° C. for a period of time of ½ to 3 hours to strip off all of the excess methanol and also to remove all of the hydrogen chloride that has been formed.

It is necessary if the alkoxylated or tetraphenyl dimer is to be stored for any period of time before the other steps of the process that the silane mixture be as neutral as possible so that it can remain stable for periods as long as one year. Accordingly, to accomplish this, a base can be added to the alkoxylated diphenylsilane or tetraphenyl dimer such a base being selected from NeOH, KOH, sodium bicarbonate, ammonium hydroxide and other bases so as to neutralize any dissolved hydrogen chloride acid in the silane. It is preferred that the alkoxylated silane have a pH of anywhere from 5 to 9 in its final form. Sodium bicarbonate any be added to the diphenyldialkoxylated silane or tetraphenyl dimer after all or most of the hydrogen chloride gas has been stripped off so as to neutralize it as much as possible. Such sodium bicarbonate or other weak base is added and may be followed by a subsequent stripping procedure in the temperature range of 25 to 60° C. until all the water or hydrogen chloride gas which still remains in the silane is completely stripped off. Such subsequent heating procedure, after the addition of the base, may be carried out anywhere from ½ to 3 hours.

Thus, the final alkoxylated diphenylsilane or alkoxylated tetraphenyl dimer that is neutralized is a very stable silane that can be stored for periods as long as 1 year or more without any condensation or any polymerization of the silane groups.

In the second subsequent phase of the process of the present invention, to the diphenyldialkoxylated silane or tetraphenyl dimer there is added a sufficient volume of a water-immiscible non-polar organic solvent so as to completely dissolve the silane. Examples of such water-immiscible non-polar organic solvents are, for instance, octane, heptane, cyclohexane, mineral spirits, benzene, toluene, xylene and other well known organic hydrocarbon solvents. It is preferred that there be added at least 2 moles of the water-immiscible organic solvent per mole of the diphenylsilane or the tetraphenyl dimer. However, the amount of water-immiscible organic solvent that is added during this phase of the process depends also on the amount of the other reactants that are added. Thus, there is also initially added to the diphenylsilane or tetraphenyl diamer from 1.0 moles to 4 moles of water per mole of the alkoxylated diphenylsilane or tetraphenyl dimer. There must be added at least 1 mole of water per mole of the diphenyldialkoxylated silane or the alkoxylated tetraphenyl dimer since that is necessary to completely hydrolyze the alkoxy groups in the silane. As much as 4.0 moles of water may be added per mole of the diphenyldialkoxylated silane or the tetraphenyl dimer. However, the excess water serves no useful purpose and necessitates the use of increased amounts of the water-immiscible organic solvent so as to dissolve the water and the diphenylsilane or tetraphenyl dimer. A dimer is a linear siloxane having two silicon atoms operated by an oxygen atom.

Most preferably, there is utilized anywhere from 10% to 30% excess water in this part of the reaction, that is, 1.1 to 1.3 moles of water per mole of the diphenyldialkoxylated silane or the tetraphenyl dimer, such that there is sufficient water to completely hydrolyze the alkoxy groups in the silane and such that large quantities of the water-immiscible organic solvent will not be necessary to maintain and keep dissolved the silane in a single phase system. The reason for necessitating the single phase system in this part of the process is that as will be pointed out below refluxing is necessary and in order to carry out the refluxing part of the process properly, a single phase system is needed.

To this reaction ingredients of water, a water-immiscible solvent and the diphenyldialkoxylated or tetraphenyl dimer there is also added an alkaline rearrangement catalyst. Suitable alkaline rearrangement catalysts are, of course, sodium hydroxide, potassium hydroxide, quaternary ammonium salts of potassium and sodium, as well as cesium hydroxide.

The alkaline rearrangement catalyst is utilized at a concentration of 10 to 5000 parts per million in the reaction mixture. Below 100 parts per million, the alkaline rearrangement catalyst is not present in sufficient concentration to catalyze the process. Above 5000 parts per million of the alkaline rearrangement catalyst, then there is too much alkaline rearrangement catalyst which reacts with the silanes to form potassium silanolates which reduce the yield of the process. After these ingredients have been mixed together and with constant agitation, the reaction mixture is heated anywhere from 1 to 6 hours and more preferably for 1 to 3 hours so as to form the desired octaphenyltetracyclicsiloxane product. It is necessary to carry out this heating procedure very slowly. Thus, in the initial part of the reaction, the reaction mixture must be heated from anywhere from 25 to 60° C. and preferably below 60° C. such as 50° C. so that the alcohol that is formed as a by-product of the reaction can be given off and stripped off from the reaction mixture without unduly causing violent escape of the alcohol by-product that is formed during the initial phases of the reaction. As can be envisioned in the initial phases of the reaction, there are large quantities of alcohol formed which will be desirably stripped off by heating the mixture close to 60° C. but somewhat below this temperature range such as, 50 to 55° C. During the latter part of the reaction cycle during which time the mixture is constantly agitated, the temperature can be raised above 60° but must be maintained below 80° C. so as to strip off more water and the remaining amounts of alcohol by-product. Since the reaction mixture still has the alkaline rearrangement catalyst, it is preferred not to exceed the heating temperature of 80° C. while such alkaline rearrangement catalyst remains in the reaction mixture unneutralized. As pointed, out this reaction is carried out under reflux so as to maintain a constant mixture of the ingredients and so as to produce the desired condensation reaction in which most of the dialkoxylateddiphenylsilane is converted to octaphenyltetracyclicsiloxane.

After this reaction has proceeded, as pointed out from 1 to 6 hours or more, and the desired equilibrium or maximum concentration of octaphenyltetracyclicsiloxane has been formed, then sufficient acid is added to the reaction mixture so as to neutralize the alkaline rearrangement catalyst. Examples of such acids are, sulfuric acid, toluene sulfonic acid, acetic acid, as well as hydrochloric acid and nitric acid. Most preferably, there is utilized hydrochloric acid since its presence does not affect the final octaphenyltetracyclicsiloxane desired product. This reaction mixture must be neutralized to an acid or base concentration of anywhere from 5 to 10 parts per million so that it will be stable during the subsequent heating steps.

As pointed out up to this step of the process, the desired octaphenyltetracyclicsiloxane has been formed and also most of the alcohol by-product and some of the water has been stripped off. Accordingly, to strip off the rest of the alcohol and water by-products that have been formed in the reaction mixture, the neutralized water-immiscible solvent phase may then be heated at a temperature of anywhere from 80 to 130° C., so as to azeotrope out the remaining water and alcohol by-products that were formed in the prior reaction. This distillation procedure may be carried out for anywhere from 1 to 8 hours and after the water-immiscible organic solvent phase has been tested to determine that all or substantially all of the water has been removed from the reaction mixture, then the reaction mixture simply contains in it the water-immiscible solvent into which is dissolved the octaphenyltetracyclicsiloxane desired product as well as other cyclicsiloxane and silane by-products. The octaphenyltetracyclicsiloxane may be separated in high purity from the water-immiscible organic solvent and the other undesired silanes or cyclicsiloxanes by simply cooling the solution to room temperature at which point the octaphenyltetracyclicsiloxane will precipitate out from the solution in high purity. Utilizing this process, it is possible to obtain octaphenyltetracyclicsiloxane in high purity at yields of up to 70 to 80% from the starting diphenyldihalogensilane.

As can be seen from the foregoing process, there are not utilized in this process excess amounts of polar solvents or even excess amounts of water-immiscible organic solvents and there are no salted solvent waste streams from the process. In addition, all the alcohol by-products that are formed can be stripped off in high purity and redistilled so that it can be recycled in the process.

The octaphenyltetracyclicsiloxane formed by the present process can be utilized to form various linear diorganopolysiloxane polymers. The octaphenyltetracyclicsiloxane may be taken and mixed at the desired concentration with cyclicsiloxanes of the formula $(R'_2SiO)_x$, chain stoppers of the formula $(R_3{}^2Si)_2O$ and from 150 to 500 parts per million of an alkaline rearrangement catalyst. The radicals R and $R^2$ in the above formulas are selected from alkyl radicals, cycloalkyl radicals and alkylene radicals of 1 to 8 carbon atoms such as, methyl, ethyl, vinyl, allyl, cyclohexyl, cycloheptyl and etc. and x in the above formula varies from 3 to 8. Other chain-stoppers that may be utilized are any linear diorganopolysiloxane having 3, 4, 5 or 6 siloxy units which are chain-stopped with triorganosiloxy units or $R_3{}^2SiO$ chain-stopping units, where $R^2$ is as defined previously. The amount of concentration of chain-stoppers in this mixture is utilized on the basis of how long the linear chain of the desired polymer is desired to be. The concentrations of the octaphenyltetracyclicsiloxane and the cyclicsiloxanes of the formula $(R'_2SiO)_x$ is also determined by how much of the particular diphenylsiloxy units and $R_2{}^1SiO$ units it is desired that the final polymer have. The alkaline rearrangement catalyst is utilized at a concentration shown above since less than 100 parts per million would not give the necessary catalytic activity and above 500 parts per million of the alkaline rearrangement catalyst results in not forming the desired high viscosity polymer.

The resulting mixture is then heated from 100 to 170° C. for anywhere from .5 to 30 hours and more preferably from .5 to 20 hours until a linear diorganopolysiloxane polymer which is chain-stopped with $R_3{}^2SiO$ units is formed. Generally, this reaction is carried out until equilibration is reached at which point 85% of the cyclicsiloxanes have been converted to a linear diorganopolysiloxane polymer. At this point, as many cyclicsiloxanes are being converted into the linear diorganopolysiloxane polymer as there is amounts of the linear diorganopolysiloxane polymer being broken up and reconverted back into the cyclicsiloxanes. When this 85% equilibration point or close to it has been reached or any other equilibration point that is desired, the reaction is terminated and the alkaline rearrangement catalyst reaction mixture is neutralized with an acid such as, toluene sulfonic acid or one of the acids mentioned in the neutralization procedure discussed previously. Then the cyclics are stripped off leaving behind a linear diorganopolysiloxane polymer having a viscosity of anywhere from 100,000 centipoise to 200,000,000 centipoise at 25° C. with the desired concentration of diphenylsiloxy units in it.

If it is desired to produce a linear silanol-stopped diorganopolysiloxane polymer of a viscosity of anywhere from 1000 to 1,000,000 centipoise at 25° C., then one of the high viscosity polymers obtained as set forth in the foregoing procedure, that is, a viscosity of anywhere from 100,000 to 200,000,000 centipoise at 25° C., which is triorganosiloxy end-stopped, is taken and subjected to steam until the high chain polymer is broken up to form low chained or low molecular weight silanol-terminated diorganopolysiloxane polymers.

Another procedure is to simply add the desired quantity of water to the high viscosity triorganosiloxy end-stopped linear diorganopolysiloxane polymer and then equilibrate the mixture at a temperature of 100° to 250° C. until the desired viscosity silanol end-stopped diorganopolysiloxane polymer is formed which has the desired concentration of diphenylsiloxy units in it.

Another method of producing silanol-stopped material is to add the appropriate concentration of water to the appropriate concentration of tetracyclicsiloxanes and equilibrate the mixture in the presence of an alkaline rearrangement catalyst.

The low viscosity triorganosiloxy end-stopped polymers, that is, ones having from 1000 to 100,000 centipoise viscosity at 25° C., may be utilized as oils or as components of silicone lubricating compositions or for many or various other purposes.

The high viscosity triorganosiloxy end-stopped linear diorganopolysiloxane polymers, that is, ones having a viscosity of 100,000 to 200,000,000 at 25° C., with the desired concentration of diphenylsiloxy units iminently useful for producing heat vulcanizable silicone rubber compositions.

Thus, with these polymers there may be mixed into them various fillers such as fumed silica, precipitated silica, and in combination with these fillers there may be utilized other fillers such as, diatomaceous earth, zinc oxide, titanium oxide and etc. as is well known in the art as well as various heat aging and flame retardant inducing ingredients such as, platinum complexes. To the resulting mixture there may be added pigments and catalysts such as the peroxide catalysts and the final composition can then be cured at elevated temperatures of anywhere from 150 to 250° C. until there is formed a silicone rubber elastomer which has many uses as electrical, insulating and weather insulating.

Examples of such heat vulcanizable silicone rubber compositions to which the present polymers of the present invention can be utilized are, for instance, the De Zuba, Berger and Selin patent application, Ser. No. 297,195, filed Oct. 13, 1971 entitled "Self-Bonding Heat Curable Silicone Rubber," whose disclosure is hereby incorporated into the present specification by reference.

The silanol-stopped linear diorganopolysiloxane polymers of lower viscosity produced in accordance with the present invention containing the desired concentration of diphenylsiloxy units may be utilized to prepare one and two-part room temperature vulcanizable silicone rubber compositions. Thus, with such silanol-terminated diorganopolysiloxanes there is mixed fillers, a cross-linking agent such as, an alkyl silicate or a triacyloxy alkylsilane, various other ingredients such as viscosity depressants, adhesion promoters, flame retardant additives and other ingredients as is well known in the art. The resulting mixture may be formed into a one-part or two-part room temperature vulcanizable silicone rubber composition which cures at room temperature to form a silicone elastomer useful for many purposes such as a sealant and many other uses.

Examples of such compositions which is well known in the art are, for instance, Lampe, U.S. Pat. 3,696,090 and Shaw, U.S. Pat. 3,701,753, whose disclosures are hereby incorporated into the present specification by reference.

In addition, the silanol chain-stopped polymers produced in accordance with the present invention may be utilized as stated above to produce one-part room temperature vulcanizable silicone rubber compositions with the cross-linking agent being trialkoxyalkylsilane to produce a non-corrosive one-part room temperature vulcanizable silicone rubber composition as in accordance with the disclosure of Smith and Hamilton, U.S. Pat. 3,689,454, whose disclosure is hereby incorporated into the present specification by reference.

The following examples are given for the purpose of illustrating specific embodiments of the present invention and are not meant to limit the scope of the invention as set forth in the specification and claims. All parts in the examples are by weight.

EXAMPLE 1

To 512 parts of diphenyldichlorosilane which is added to a 2-liter flask equipped with a separatory funnel (with dip pipe), a mechanical stirrer, and a condenser which is vented to an HCl wet scrubber, there is added 128 parts of methanol at a rapid dropwise rate to the pot contents with the evolution of HCl. The pot is initially cooled to 10° C. and later warmed to 40° C. without external heating or cooling. The batch is brought to reflux for 30 minutes after the complete addition of the methanol. An additional 128 parts of methanol is added while the batch is at reflux and a distillate is collected (160 parts). The batch is cooled to 50° C. This additional methanol is used to reduce the hydrochloric acid content of the batch. The HCl content is 3720 p.p.m. Sufficient sodium methylate in methanol (10% solution) is added to make the batch basic (equivalent to 500 p.p.m. NaOH). Then, 600 ml. of toluene along with 40 ml. of water is added to the pot which is then raised to 65° C. After twenty minutes, reflux is noted. One hour after the batch reached reflux, sufficient 37% HCl solution is added to make the batch neutral. The refluxing liquid is distilled and collected. Initially, a large quantity of distillate is collected at 67° C. Then the batch temperature began to climb. Distillation is continued until a batch temperature of 118° C. is obtained. The batch was filtered free of salts while hot and the filtrate is then cooled. Crystals formed on cooling. These are collected by filtration and washed once with chilled toluene. The yield of product octaphenyltetracyclicsiloxane, melting point 187–189° C., is 68% (270 parts).

EXAMPLE 2

To 253 parts of diphenyldichlorosilane which is added to a 1-liter 3-necked flask equipped with a separatory funnel, mechanical stirrer, and condenser which was vented to an HCl wet scrubber, there is added 9 parts of water and 32 parts of methanol and the ingredients are mixed, added to the separatory funnel and then added dropwise through a dip pipe to the dichlorodiphenylsilane. HCl is evolved and is scrubbed away. When the addition of alcohol and water is completed, the batch is brought to reflux for 30 minutes at which time 20 cc. of methanol is added dropwise to the batch and immediately distilled away. After the operation is completed, the HCl content of the batch is 13,000 p.p.m. The batch is neutralized with 50% sodium hydroxide and additional water is added such that the total water (from the NaOH solution plus added) is 9 ml. An excess of 1000 p.p.m. NaOH is added to make the batch basic. Then 200 ml. of toluene is added and the batch is brought to reflux (67° C.) for one hour. Then 3.7% HCl solution is added to neutralize the batch and the stripping off of distillate is begun. Volatiles were distilled from the batch until the batch temperature is 120° C. The solution is filtered hot to remove salts and then cooled. Crystallization took place during cooling and the crystals are filtered. The filter cake is titurated with acetone, refiltered and dried. Yield of product is 134 parts (68%) yield, melting point 187.5–189° C.

EXAMPLE 3

There is added 92 parts of ethanol which is added dropwise at room temperature through a dip pipe to 253 parts of agitated diphenyldichlorosilane. HCl gas is evolved and is vented through a condenser to a wet scrubber. When addition is complete, the batch is heated to reflux for 30 minutes. While at reflux, an additional 92 parts of ethanol is added dropwise to the batch and immediately distilled off. The HCl content of the batch after this procedure is 3200 p.p.m. The batch is cooled and neutralized with 50% aqueous sodium hydroxide and then made basic by the addition of 1000 p.p.m. NaOH. Then, 18 ml. of water and 200 ml. of toluene are added and the batch is brought to reflux (79°) for 2 hours. Sufficient 3.7% aqueous HCl is added to make the batch neutral and distillation of volatiles is carried out. Volatiles are removed until the batch temperature is 120° C. The hot solution is filtered free of salt and allowed to cool and form crystals. The crystallized mass is filtered and the filter cake is titurated with acetone. The crystals are refiltered and dried. Yield of crystals is 145 parts (72%) yield, melting point 188–189° C.

I claim:

1. A process for producing octaphenyltetracyclicsiloxanes comprising (a) contacting $(C_6H_5)_2SiX_2$, where X is halogen and which compound has trace amounts of the other halogen silanes with an ingredient selected from the class consisting of an alcohol of the formula, ROH, and a mixture of water and an alcohol where up to 50 mole percent of the mixture can be water, where R is selected from monovalent hydrocarbon radicals and halogenated monovalent hydrocarbon radicals of up to 8 carbon atoms to form substantially a reaction product of the formula $(C_6H_5)_2Si(OR)_2 \cdot$ (b) removing any acid that is formed; (c) adding water, a water-immiscible organic solvent and an alkaline rearrangement catalyst to the reaction product of (a) and (b); and (d) heating the resulting mixture from 40° C. to below 80° C. to form the desired product.

2. The process of Claim 1 wherein in step (a) there is added at least 2.0 moles of the alcohol or of the alcohol and water mixture per mole of $(C_6H_5)_2SiX_2$.

3. The process of Claim 2 wherein in step (c) there is added 1.0 moles to 4.0 moles of water per mole of $(C_6H_5)_2Si(OR)_2$ and at least 2 moles of the water-immiscible organic solvent per mole of $(C_6H_5)_2Si(OR)_2$.

4. The process of Claim 3 wherein in step (c) most of the acid that is formed is removed by heating the reaction mixture from 20 to 80° C. and a base is added to neutralize the reaction mixture.

5. The process of Claim 4 wherein in step (c) the water-immiscible organic solvent is selected from the class consisting of toluene, xylene, pentane, octane and cyclohexane.

6. The process of Claim 5 wherein in step (c) the alkaline rearrangement catalyst is selected from the class consisting of sodium hydroxide and potassium hydroxide.

7. The process of Claim 6 wherein in step (c) the alkaline rearrangement catalyst is utilized at a concentration of 10–5000 parts per million in the reaction mixture.

8. The process of Claim 1 wherein R is selected from the class consisting of alkyl radicals and alkyloxyalkylene radicals of 1 to 8 carbon atoms.

9. The process of Claim 4 wherein in step (d) the mixture is heated from 40 to 60° C. for 1 to 6 hours to form the desired product and strip off alcohol and water.

10. The process of Claim 9 further comprising adding an acid to the reaction mixture so as to neutralize said alkaline rearrangement catalyst such that the reaction mixture is either acidic or alkaline by 5 to 10 parts per million and then heating the reaction mixture from 80 to 130° C. to drive off all alcohol and water and then cooling the reaction mixture to room temperature to precipitate out from the solution octaphenyltetracyclicsiloxane.

11. The process of Claim 9 further comprising taking the octaphenyltetracyclicsiloxane product and adding to it cyclicsiloxanes of the formula,

chain-stoppers of the formula,

and from 100 to 500 parts per million of a catalyst where R' and $R^2$ are selected from alkyl radicals, cycloalkyl radicals, and alkenyl radicals of 1 to 8 carbon atoms, $x$ varies from 3 to 8 and heating the resulting mixture from 100 to 170° C. for 0.5 to 30 hours to form a linear polysiloxane polymer with a viscosity of 1000 to 200,000,000 centipoise at 25° C.

References Cited

UNITED STATES PATENTS

| | | | |
|---|---|---|---|
| 3,557,177 | 1/1971 | Selin | 260—448.2 E |
| 3,627,805 | 12/1971 | Thomas et al. | 260—448.2 E |
| 3,652,628 | 3/1972 | Hyde et al. | 260—448.2 E X |
| 3,546,265 | 12/1970 | Schank | 260—448.2 E |
| 3,432,538 | 3/1969 | Curry | 260—448.2 E |
| 3,332,972 | 7/1967 | Brown | 260—448.2 E |
| 3,523,131 | 8/1970 | Sciwinski | 260—448.2 E |
| 3,504,006 | 3/1970 | Modic | 260—448.2 E |
| 3,590,064 | 6/1971 | Lacefield | 260—448.2 E |

DANIEL E. WYMAN, Primary Examiner

P. F. SHAVER, Assistant Examiner

U.S. Cl. X.R.

260—46.5 G, 46.5 R